US012733071B2

(12) United States Patent
Hampl et al.

(10) Patent No.: US 12,733,071 B2
(45) Date of Patent: Sep. 8, 2026

(54) INFRARED RADIATION SOURCE

(71) Applicant: Infineon Technologies AG, Neubiberg (DE)

(72) Inventors: Stefan Hampl, Dresden (DE); Kerstin Kämmer, Radebeul (DE); Olaf Storbeck, Dresden (DE); Ines Uhlig, Dresden (DE)

(73) Assignee: INFINEON TECHNOLOGIES AG, Neubiberg (DE)

( * ) Notice: Subject to any disclaimer, the term of this patent is extended or adjusted under 35 U.S.C. 154(b) by 929 days.

(21) Appl. No.: 18/047,912

(22) Filed: Oct. 19, 2022

(65) Prior Publication Data

US 2023/0127662 A1 Apr. 27, 2023

(30) Foreign Application Priority Data

Oct. 22, 2021 (EP) .................................... 21204275

(51) Int. Cl.
*H05B 3/44* (2006.01)

(52) U.S. Cl.
CPC ...................................... *H05B 3/44* (2013.01)

(58) Field of Classification Search
CPC .................................... H05B 3/44; H05B 3/10
USPC ......................................... 219/552, 553, 541
See application file for complete search history.

(56) References Cited

U.S. PATENT DOCUMENTS 3,443,144 A * 5/1969 Freese, Jr. ................ H01K 5/02 313/274
4,804,823 A * 2/1989 Okuda .................. C04B 41/009 219/541

FOREIGN PATENT DOCUMENTS

EP 0689229 A2 12/1995
WO 2016145127 A1 9/2016

OTHER PUBLICATIONS

Mastrangelo, Carlos H., et al., "Electrical and Optical Characteristics of Vacuum-Sealed Polysilicon Microlamps", IEEE Transactions on Electron Device, 39, Jun. 1992, New York, US, 13 pages.
Schroeder, S., et al., "Fabrication of an infrared emitter using a generic integration platform based on wire bonding", IOP Publishing, Journal of Micromechanics and Microengineerng, 26, Oct. 5, 2016, 10 pages.
Tu, Juliana et al., "Micromachined, silicon filament light source for spectrophotometric microsystems", Applied Optics, vol. 42, No. 13, May 1, 2003, 10 pages.

* cited by examiner

*Primary Examiner* — Phuong T Nguyen
(74) *Attorney, Agent, or Firm* — Slater Matsil, LLP

(57) ABSTRACT

An IR (infrared) radiation source includes a sealed cavity structure enclosing a vacuum chamber having a low atmospheric pressure, wherein the sealed cavity structure includes a thermally and electrically insulating material for enclosing the vacuum chamber, heating filaments extending in the vacuum chamber between opposing electrode regions at opposing wall regions of the vacuum chamber, wherein the heating filaments are electrically connected in parallel, and wherein the heating filaments and the electrode regions have a highly electrically conductive material, and an optical isolation structure adjacent to the vacuum chamber for optically confining the IR radiation and providing a predominant propagation direction of the IR radiation.

20 Claims, 8 Drawing Sheets

INFRARED RADIATION SOURCE

CROSS-REFERENCE TO RELATED APPLICATIONS

This application claims the benefit of European Patent Application No. 21204275, filed on Oct. 22, 2021, which application is hereby incorporated herein by reference.

TECHNICAL FIELD

Embodiments of the present disclosure relate to an IR (infrared) radiation source. More specifically, embodiments relate to an infrared radiation source with filament heating elements in a cavity (vacuum chamber) for providing a highly efficient filament radiation heater. Moreover, embodiments relate to a filament "micro" IR heater (radiation source).

BACKGROUND

The sensing of environmental parameters in the ambient atmosphere, such as sound, noise, temperature, gases, etc., with MEMS-based devices gains more and more importance in the implementation of appropriate sensors within mobile devices, home automation, such as smart-home, and the automotive sector.

In gas sensor systems based on the photoacoustic principle, for example, a broad-band radiator in the infrared range (e.g., 1 μm to 10 μm) is required for exciting gas molecules of different types. In PAS sensor systems (PAS=photoacoustic spectroscopy), planar, non-insulated radiators are generally used for generating the required excitation lines. However, only a small amount of the electrical power is transferred into the emitted optical power (optical energy).

A further application case is a radiation heater used for inducing thermal phase transitions in phase transition materials, such as GeSbTe (GST). For generating the phase transition in GST materials, usually a tungsten heater is used which is in direct contact to the material. This has a negative impact on the potentially achievable cooling rate and, thus, on the amorphization of the GST material.

Therefore, there is a need in the field of IR radiation sources to implement an IR radiation source having improved characteristics, e.g. an improved efficiency, when compared to current IR radiation sources.

Such a need can be solved by the IR radiation source according to independent claim 1.

Further, specific implementations of the IR radiation source are defined in the dependent claims.

SUMMARY

According to an embodiment, an IR (infrared) radiation source comprises a sealed cavity structure enclosing a vacuum chamber having a low atmospheric pressure, wherein the sealed cavity structure comprises a thermally and electrically insulating material for enclosing the vacuum chamber, a plurality of heating filaments extending in the vacuum chamber between opposing electrode regions at opposing wall regions of the vacuum chamber, wherein the heating filaments are electrically connected in parallel, and wherein the heating filaments and the electrode regions have a highly electrically conductive material, and an optical isolation structure adjacent to the sealed cavity structure for optically confining the IR radiation and providing a predominant propagation direction of the IR radiation.

According to the IR radiation source with filament heating elements in a vacuum chamber, an increased efficiency can be achieved when compared to current IR radiation sources, wherein the IR radiation source according to the embodiments can be manufactured as an integrated application on a wafer, e.g. a Si wafer, wherein the manufacturing process is in principle CMOS compatible.

To be more specific, in case of a PAS sensor system, the suggested filament radiation heater comprises a high radiation yield when compared to the electrical power used, resulting in an increased efficiency.

When generating the phase transition in a GST material, the utilization of the suggested filament radiation heater allows a faster cooling rate of the material since the heat source and the GST material are spatially separated (spaced).

BRIEF DESCRIPTION OF THE DRAWINGS

In the following, embodiments of the present disclosure are described in more detail with reference to the figures, in which.

In the following description, embodiments are discussed in further detail using the figures, wherein in the figures and the specification identical elements and elements having the same functionality and/or the same technical or physical effect are provided with the same reference numbers or are identified with the same name. Thus, the description of these elements and of the functionality thereof as illustrated in the different embodiments are mutually exchangeable or may be applied to one another in the different embodiments.

DETAILED DESCRIPTION OF ILLUSTRATIVE EMBODIMENTS

In the following description, embodiments are discussed in detail, however, it should be appreciated that the embodiments provide many applicable concepts that can be embodied in a wide variety of semiconductor devices. The specific embodiments discussed are merely illustrative of specific ways to make and use the present concept, and do not limit the scope of the embodiments. In the following description of embodiments, the same or similar elements having the same function have associated therewith the same reference signs or the same name, and a description of such elements will not be repeated for every embodiment. Moreover, features of the different embodiments described hereinafter may be combined with each other, unless specifically noted otherwise.

It is understood that when an element is referred to as being "connected" or "coupled" to another element, it may be directly connected or coupled to the other element, or intermediate elements may be present. Conversely, when an element is referred to as being "directly" connected to another element, "connected" or "coupled," there are no intermediate elements. Other terms used to describe the relationship between elements should be construed in a similar fashion (e.g., “between” versus “directly between”, “adjacent” versus “directly adjacent”, and “on” versus “directly on”, etc.).

For facilitating the description of the different embodiments, some of the figures comprise a Cartesian coordinate system x, y, z, wherein the x-y-plane corresponds, i.e. is parallel, to a first main surface region of a substrate (=a reference plane=x-y-plane), wherein the direction vertically up with respect to the reference plane (x-y-plane) corresponds to the “+z” direction, and wherein the direction vertically down with respect to the reference plane (x-y-plane) corresponds to the “−z” direction. In the following description, the term “lateral” means a direction parallel to the x- and/or y-direction or a direction parallel to the x-y-plane, wherein the term “vertical” means a direction parallel to the z-direction.

Figure 1:
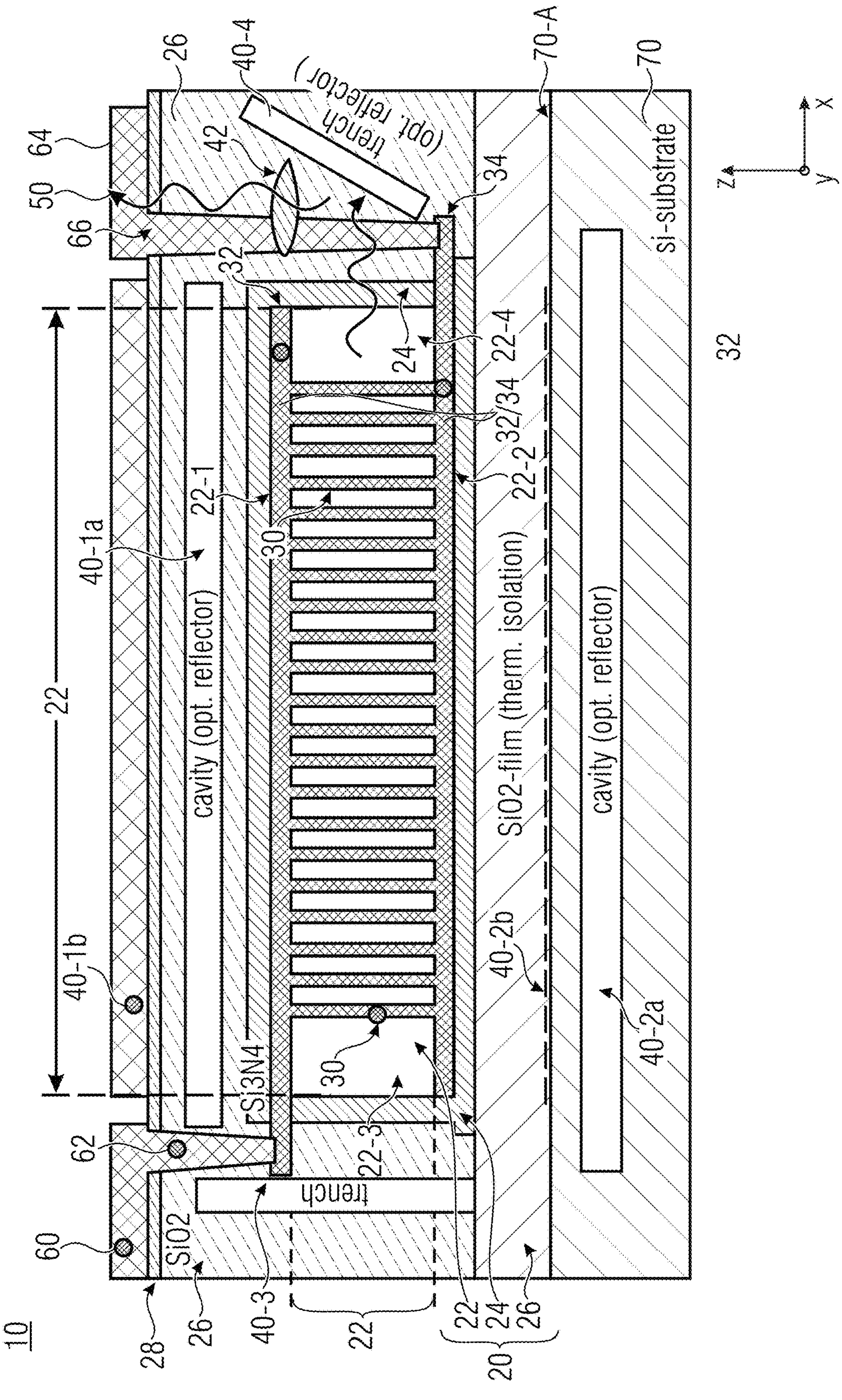
FIG. 1 shows a schematic cross-sectional view of an IR radiation source according to an embodiment.

FIG. 1 shows a schematic cross-sectional view of an IR (infrared) radiation source 10 according to an embodiment. The vertical schematic cross-sectional view is parallel to the x-z-plane (=vertical plane).

The IR radiation source 10 comprises a sealed cavity structure 20, e.g. in form of an encapsulation structure, enclosing a vacuum chamber 22 having low atmospheric pressure, e.g. a low internal atmospheric pressure, such as a near vacuum condition. The sealed cavity structure comprises a thermally and electrically insulating material 24, 26 or a corresponding material combination for enclosing, such as encapsulating and sealing, the vacuum chamber 22.

The IR radiation source 10 further comprises a plurality of heating filaments 30 extending in the vacuum chamber 22 between opposing electrode regions 32, 34 at opposing wall regions 22-1, 22-2 of the vacuum chamber 22. According to the embodiment, the heating filaments 30 are electrically connected in parallel, wherein the heating filaments 30 and the electrode regions 32, 34 have a highly electrically conductive material. The highly electrically conductive material of the heating filaments 30 and the electrode regions 32, 34 may comprise a specific electrical resistance (=electrical resistivity) below 5 mOhm cm, e.g. between 5 mOhm cm and 0.1 mOhm cm.

The IR radiation source 10 further comprises an optical isolation structure 40 adjacent to the vacuum chamber 22 (and the sealed cavity structure 20) for optically confining the IR radiation and providing a predominant propagation direction of the IR radiation 50.

To be more specific, the optical isolation structure 40 may be arranged adjacent (e.g., parallel) to at least one, to a plurality or to all side wall regions 22-1, . . . 22-6, for example, of the vacuum chamber 22 for optically confining the IR radiation 50 generated by the IR radiation source 10 in an activated condition, i.e. in an energized condition of the heating filaments 30, and for providing a predominant propagation direction of the IR radiation 50 in the sealed cavity structure 20 and for providing a predominant emission direction of the IR radiation 50 from the sealed cavity structure 20.

In case, the vacuum chamber 22 comprises a rectangular footprint, the sealed cavity structure 20 and the vacuum chamber 22 may be regarded, for example, as a rectangular parallelepiped or cuboid having three pairs of opposing side faces or side wall regions 22-1, . . . 22-6. The opposing side wall regions 22-1, 22-2 extend parallel to the x-y-plane, the opposing side wall regions 22-3, 22-4 extend parallel to the y-z-plane, and the opposing side wall regions 22-5, 22-6 extend parallel to the x-z-plane. However, as described below in further embodiments, the vacuum chamber 22 may comprise a rectangular, square, circular, elliptic, etc. footprint shape and comprises the correspondingly shaped side wall regions, wherein the heating filaments 30 are enclosed in sealed cavity structure 22.

As exemplarily shown in FIG. 1, the optical isolation structure 40 of the IR radiation source 10 may comprise at least one reflector element 40-1*a*, . . . , 40-6 (=40-#) for optically confining the IR radiation 50 and providing a predominant propagation direction of the IR radiation 50. Thus, the further reflector elements 40-1*a*, . . . , 40-6, as optionally shown in FIG. 1, are only shown for illustrating the different implementation options of the optical isolation structure 40, wherein the different isolation elements of the optical isolation structure 40-1*a*, . . . , 40-6 are described below in more detail. According to an embodiment, the optical isolation structure may comprise (at least) one, a plurality or all reflector elements 40-1*a*, . . . , 40-6 (as shown in FIG. 1) for optically confining and/or directing the IR radiation 50.

The reflector element 40-1*a* may be formed as a cavity (optical reflector) in the insulating material layer 24 and is arranged adjacent and parallel to the first side wall region 22-1 of the vacuum chamber 22. The reflector element 40-1*b* may be formed as a metallization layer (optical reflector) on the insulating material layer 24 and is arranged adjacent and parallel to the first side wall region 22-1 of the vacuum chamber 22.

The reflector element 40-2*a* may be formed as a cavity (optical reflector) in the substrate 70 (or in the insulating material layer 24) and is arranged adjacent and parallel to the second side wall region 22-2 of the vacuum chamber 22. The reflector element 40-2*b* may be formed as a metallization layer (optical reflector) on the substrate 70 or in the insulating material layer 24 and is arranged adjacent and parallel to the second side wall region 22-2 of the vacuum chamber 22.

The reflector element 40-3 may be formed as a trench (optical reflector) in the insulating material layer 24 and is arranged adjacent and parallel (or inclined) to the third side wall region 22-3 of the vacuum chamber 22. The reflector element 40-4 may be formed as a trench (optical reflector) in the insulating material layer 24 and is arranged adjacent and inclined (or parallel) to the fourth side wall region 22-4 of the vacuum chamber 22.

The reflector element 40-5 (see for example FIGS. 2*a*-2*d*) may be formed as a trench (optical reflector) in the insulating material layer 24 and is arranged adjacent and parallel to the fifth side wall region 22-5 (parallel to the x-z-plane—see for example FIGS. 2*a*-2*d*) of the vacuum chamber 22. The reflector element 40-6 (see for example FIGS. 2*a*-2*d*) may be formed as a trench (optical reflector) in the insulating material layer 24 and is arranged adjacent and parallel to the sixth side wall region 22-6 (parallel to the x-z-plane—see for example FIGS. 2*a*-2*d*) of the vacuum chamber 22. Thus, the optical isolation structure 40 may comprise at least one of the cavities 40-1*a*, 40-2*a*, of the trenches 40-3, 40-4, 40-5, 40-6, and/or of the metal films 40-1*b*, 40-2*b* for defining the optical path of the generated IR radiation 50.

Moreover, the IR radiation source 10 further comprises contact pads 60 and vias 62 for electrically connecting the top-electrode region 32 and comprises the contact pad 64 and the via 66 for contacting the opposing electrode region 34 (at opposing wall regions of the vacuum chamber 22). The contact pads 60, 64 may be provided for an external connectivity of the IR radiation source 10. The contact pads 60, 64 may be arrange in the same plane as the metallization layer 40-1*b*.

As further shown in FIG. 1, the IR radiation source 10 may be arranged on a substrate 70, wherein the substrate 70 may comprise a semiconductor material, such as silicon, or a glass material, etc.

The present concept for implementing the IR radiation source 10 (radiation heater) results in a highly efficient radiation heater 10 by using the heating filaments 30 of a material with a high melting point, wherein the material may comprise or consist of carbon, graphene, polysilicon or tungsten, for example. The arrangement of the heating filaments 30 in the vacuum chamber 22 of the sealed cavity structure 20 provides a thermal isolation of the heating filaments 30. The material for the heating filaments 30 and the opposing electrode regions 32, 34 (top and bottom electrodes) is highly electrically conducting and may be chosen to be transparent for the generated IR radiation in the energized condition of the heating filaments 30.

The IR radiation source 10 using the plurality of heating filaments 30 allows the utilization of different materials for the heating elements 30, i.e. the heating filaments 30, between the opposing electrode regions 32, 34, resulting in an optimization of the characteristics of the IR radiation source 10. Thus, the emission spectrum of the IR radiation source 10 may be optimized based on the same material used for the heating filaments 30 and the opposing electrode regions 32, 34. A high working temperature in the energized condition of the heating filaments 30, e.g. by using carbon with a melting temperature TM=4099° C. at a good vacuum level (e.g., near vacuum) in the vacuum chamber 22 results in a high light intensity of the generated IR radiation 50, for example.

The vertical arrangement of the heating filaments 30 between the opposing electrode regions 32, 34 at opposing wall regions 22-1, 22-2 of the vacuum chamber 22 allows for an electrical parallel connection of the heating filaments 30 resulting in a relatively low operation voltage needed for operating the filaments 30, such as to bring the filaments 30 in a glowing (=annealing or red heat) condition. Based on the specific arrangement of the IR radiation source 10, a high light intensity (IR radiation intensity) at a reduced chip area can be achieved by the IR radiation heater 10 when compared to state of the art infrared heaters.

Furthermore, the modular layout of the IR radiation source 10 according to the embodiments is easy to adapt to specific applications, e.g. to PAS or GST applications. Furthermore, the manufacturing process of the IR radiation source 10 is easily integratable in a CMOS manufacturing process flow. Moreover, current CMOS manufacturing processes allow to achieve a high mechanical stability, a high temperature homogeneity and a high vacuum stability of the IR radiation source 10.

To summarize, the IR radiation source 10 according to embodiments, provides a broad-band IR source with a high opto-electrical efficiency. Further, the structure and setup of the IR radiation source 10 allows to implement a manufacturing process which is compatible with current CMOS process flows.

The vertical current flow through the heating filaments 30 which have a high aspect ratio and are arranged in an electrical parallel connection by means of the top and bottom plate electrodes 32, 34, respectively, results in a compact device 10 with a high radiation density at a (relatively) low operating voltage.

Moreover, the materials for the heating filaments 30 may be selectively chosen to comprise a high melting point, a sufficient electrical conductivity, a CMOS process compatibility, and the possibility of having a high aspect ratio deposition. Exemplary materials for the heating filaments 30 are, for example, carbon, graphene, polysilicon or tungsten. The above indicated materials are suited for this application due their high melting point, low expansion coefficient and sufficient (high) conductivity, and their technological manufacturability in high aspect ratios and different/various geometries.

For providing a thermal isolation and a diffusion isolation (barrier) of the vacuum chamber 22 (filament cavity) of the sealed cavity structure 20, an insulating material, such as silicon nitride ($Si_3N_4$) or titanium nitride (TiN) may be used, for example. These materials have a large band gap and a low thermal conductivity. Furthermore, these materials have a high density to (long-term) prevent hydrogen or oxygen diffusion into the vacuum chamber 22. Furthermore, these materials have a low thermal expansion coefficient and are compatible to CMOS process flows.

The optical isolation structure 40 (with at least one reflection element 40-#) may form a light pipe for confining the generated IR radiation 50 and providing a predominant propagation direction and emission direction of the generated IR radiation 50. Thus, the optical isolation structure 40 may comprise at least one or a plurality of trenches, cavities and/or metal films for defining the optical path of the generated IR radiation 50.

The IR radiation source 10, which is implemented according to the different embodiments, uses the fact that the radiation yield increases by $T^4$ (Boltzmann Law), so that a material for the heating filaments 30 having a high melting point (temperature of destruction) contributes to a high IR radiation yield. The IR radiation emission of the heating filaments 30 is generated by the interaction between the current flow (electrons) through the heating filaments 30 and the material of the heating filaments 30. Thus, a high current flow and a corresponding geometry in form of the heating filaments 30 favors and supports the IR radiation emission of the IR radiation source 10. A relatively low temperature (i.e., a temperature as low as possible) in the connection area, i.e. at the opposing electrode regions 32, 34, may be achieved by the utilization of a highly electrically conductive material, e.g. with a specific electrical resistance (electrical resistivity) below 5 mOhm cm.

The resistance can be adjusted based on the material of and the geometry for the heating filaments 30 based on the Ohm's Law $R=\rho\times l/A$. Therefore, the opposing electrode regions 32, 34 for parallel connecting the heating filaments 30 may comprise the highest possible conductivity (due to the same material as the heating filaments 30, the same conductivity) and a relatively large area.

Moreover, the efficiency of the IR radiation source 10 is further increased as the annealing or glowing region, i.e. the vacuum chamber 22, loses a very small amount of energy due to a very low heat conduction and heat convection to adjacent regions or the environment. Thus, the IR radiation source 10 allows due to its specific structure that essentially all or at least a predominant amount of the generated IR radiation is used and consumed for the intended utilization of providing and emitting the IR radiation 50 (and is not emitted and radiated in an unused way).

Moreover, the IR radiation source 10 allows for a high thermal stability and a manageable technological manufacturability.

Based on the design and the structure of the IR radiation source 10 according to the embodiments, the emitted radiation amount (radiation portion) is at high temperatures (red to yellow glowing heating elements 30) very high and can be directed and bundled by the optical isolation structure 40, such as by means of the optical reflectors 40-# and optional further optical elements, such as lenses. Thus, the usable energy of the IR radiation source 10 is increased due to the reduced convection and heat conduction to adjacent regions. Moreover, the emitted radiation is minimally absorbed by materials (substances) outside the intended energy flow, thus resulting in reduced (low) convection losses. As a consequence, the present heater system in form of the IR radiation source 10 achieves a high system inertia, which results in a high threshold frequency (cut-off frequency) for on- and off-switching operations.

According to an embodiment, the heating filaments 30 and the electrode regions 32, 34 comprise the same highly electrically conductive material having a melting temperature or melting point higher than 1000°, 2000° or 3500° Celsius. Thus, the conductive material of the heating filaments may comprise carbon, graphene, polysilicon or tungsten for providing the high annealing (soak) temperature.

According to an embodiment, the opposing electrode regions 32, 34 of the heating filaments 30 are formed as planar electrodes or plate electrodes. The heating filaments may have a length (between the opposing electrode regions) between 0.1 and 80 μm (or between 2 and 200 μm) and have an aspect ratio (diameter to depth) of 1:1 up to 1:80. This corresponds to a thickness of the filaments 30 of about 1 nm to 1 μm. The spacing between the filaments 30 is in the range between 10 nm and 1 μm.

According to embodiments of the IR radiation source 10, the IR radiation 50 is generated in or with the filaments 30 located in an evacuated cavity (the vacuum chamber) 22, wherein the filaments 30 are connected by the top and bottom electrode 32, 34 (=the opposing electrode regions 32, 34). Moreover, the electrode regions 32, 34 are connected to contact pads 60, 64 and vias 62, 66 for an external connectivity.

According to an embodiment, the insulator material of the sealed cavity structure 20 is optically transparent to the IR radiation 50, i.e. for the radiation 50 generated by the heating filament(s) 30 in an excitation condition in the vacuum chamber 22.

According to an embodiment, the insulating material 24, 26 of the sealed cavity structure 20 comprises a first insulating layer 24 having a silicon nitride material enclosing the vacuum chamber 22 of the sealed cavity structure 20. The first layer 24 may have a thickness of at least 0.3 μm, e.g. between 0.3 and 1 μm.

According to an embodiment, the insulating material 24, 26 of the sealed cavity structure 20 further comprises a second insulating layer 26 comprising a silicon dioxide material for enclosing the first layer 24. The second layer 26 may have a thickness of at least 1 μm, e.g. between 1 and 3 μm.

According to an embodiment, the insulating material 24, 26 of the sealed cavity structure 20 further comprises a third insulating layer 28, e.g. a passivation layer, comprising a titanium nitride material. The third layer may have a thickness between 0.1 and 0.3 μm, e.g. about 200 nanometers.

Thus, according to embodiments, the thermal isolation of the vacuum chamber 22 and of the heating filaments 30 which are arranged therein, is achieved by a silicon oxide housing having a thickness of at least 1 μm.

Furthermore, according to an embodiment, the low atmospheric pressure in the vacuum chamber 22 comprises a cavity pressure less than 3 mbar (2.25 Torr) or less than 1 mbar (0.75 Torr). Thus, the vacuum in the vacuum chamber 22 may be in a range of 1 mbar or below and long-term stable. This can be achieved by the SiN encapsulation, wherein the SiN material (having a thickness of roughly 200 nm) is a diffusion barrier, even for hydrogen.

Thus, the vacuum chamber may comprise a reduced low atmospheric pressure (vacuum or near vacuum) with an atmospheric pressure of about or below 3 mbar or 1 mbar. The internal atmospheric pressure in the cavity chamber may, therefore, be in a range between 3 mbar and 0.1 mbar. The reduced atmospheric pressure in the vacuum chamber 22 may be achieved based on the process pressure during the position of the different layers for forming the sealed cavity structure 20 and sealing the vacuum chamber 22, such that the cavity chamber has said reduced atmospheric pressure.

According to an embodiment, the optical isolation structure 40 forms an optical waveguide structure for providing an optical path with the predominant propagation direction of the IR radiation 50 in the sealed cavity structure 20. According to an embodiment, the optical isolation structure may comprise optical reflector elements 40-# for providing the optical path for the IR radiation 50 in the sealed cavity structure 20.

According to an embodiment, the optical reflector elements 40-# of the optical isolation structure 40 comprise a metallization layer adjacent to the side wall region of the sealed cavity structure 20, and/or the optical reflector elements 40-# of the optical isolation structure 40 may comprise a cavity in the substrate 70 or a trench in the insulating material 24, 26 of the sealed cavity structure 20 or adjacent to the sealed cavity structure 20.

According to an embodiment, the sealed cavity structure 40, i.e. at least on optical reflector element 40-# of the optical isolation structure 40, is arranged on the substrate 70, wherein the optical isolation structure 40 may be formed as a metallization layer on a surface region 70-A of the substrate 70 adjacent to a side wall region of the sealed cavity structure 20. Additionally or alternatively, the optical isolation structure 40, i.e. at least one optical reflector element 40-# of the optical isolation structure 40, may be formed as a cavity in the substrate 70 adjacent to the side wall region of the sealed cavity structure 20. According to an embodiment, the cavity 40-# may be formed by means of a SON process (SON=silicon on nothing), which is also called as a venezia process, in the substrate 70 (semiconductor substrate or Si wafer) adjacent to the side wall region of the sealed cavity structure 20.

According to an embodiment, the cavities of the optical isolation structure 40 may comprise a thickness of about 0.3-1 μm, wherein the trenches of the optical isolation structure 40 comprise a width of about 0.1-0.5 μm.

According to an embodiment, the IR radiation source 10 may further comprise an optical element 40-# for guiding the IR radiation 50, wherein the optical element 40-# comprises a lens and/or prism-element at a radiation output area (radiation outlet) of the sealed cavity structure 20.

According to the embodiments of the IR radiation source 10, an undesired and unintended emission of IR radiation is prevented, in that the radiator cavity 22 (vacuum chamber) itself is enclosed by optical isolation structures, such as cavities (with a thickness of 0.1 to 1 μm) and trenches (with a width of 0.1 to 0.5 μm) in the surrounding silicon oxide layers 26 and/or in the substrate 70, such as a semiconductor wafer, except for the intended radiation output location and radiation emission direction.

The specific arrangement of the optical isolation structure 40 forms a kind of an optical waveguide structure for providing an optical path with a predominant propagation direction of the IR radiation in the sealed cavity structure and a predominant emission direction of the generated IR radiation from the IR radiation source 10. Thus, the optical isolation structure 40 may comprise at least or a plurality of trenches, cavities and/or metal films for defining the optical path of the generated IR radiation 50.

Thus, an optical isolation of the generated IR radiation may be achieved by the IR radiation source according to the embodiments described herein.

In the present description of embodiments, the same or similar elements having the same structure and/or function are provided with the same reference numbers or the same name, wherein a detailed description of such elements will not be repeated for every embodiment. Thus, the above description with respect to FIG. 1 is equally applicable to the further embodiments as described below. In the following description, essentially the differences, e.g. additional, changed or replaced elements, to the embodiment as shown in FIG. 1 and the technical effect(s) resulting therefrom are discussed in detail.

With respect to the arrangement and geometry of the heating filaments 30 in the vacuum chamber 22, it is now referred to the exemplary schematic plane views (parallel to the x-y-plane) in FIGS. 2*a*-2*d* of the vacuum chamber 22 with circular heating filaments 30 according to an embodiment.

Figure 2A:
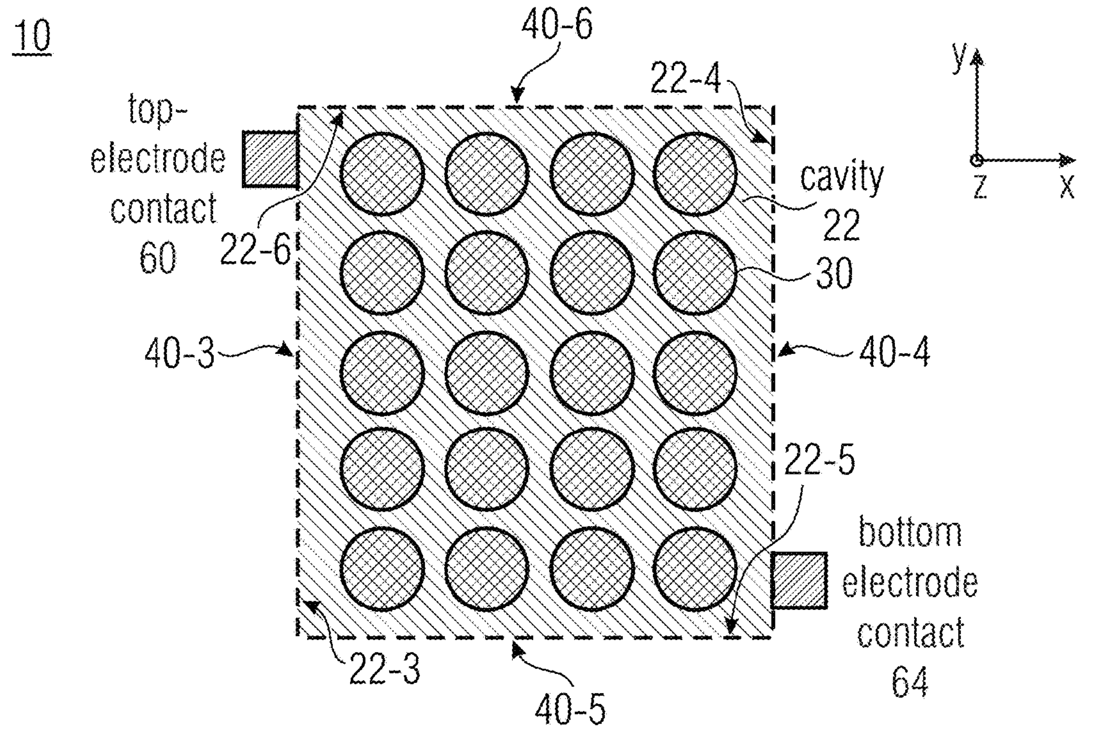
FIGS. 2*a*-2*d* show schematic plane views of different IR radiation sources having different radiation emission directions according to embodiments.

As shown in FIG. 2*a*, the heating filaments 30 may be arranged as a rectangular m×n array in a square or rectangular vacuum chamber 22, i.e. in a vacuum chamber 22 having a square or rectangular footprint parallel to the x-y-plane. The array of heating filaments 30 may have a plurality with m×n heating filaments, with m is an integer ≥2 (m=2, 3, 4, 5 . . . ) and with n is an integer ≥2 (n=2, 3, 4, 5 . . . ) The top and bottom electrode contacts 62, 66 are arranged at diagonally opposing portions of the electrode regions 32, 34. The reflector elements 40-3, 40-4 may be formed as optical reflectors adjacent and parallel to the third and fourth side wall regions 22-3, 22-4 of the vacuum chamber 22. The reflector elements 40-5, 40-6 may be formed as optical reflectors adjacent and parallel to the fifth and sixth side wall regions 22-5, 22-6 of the vacuum chamber 22.

Figure 2B:
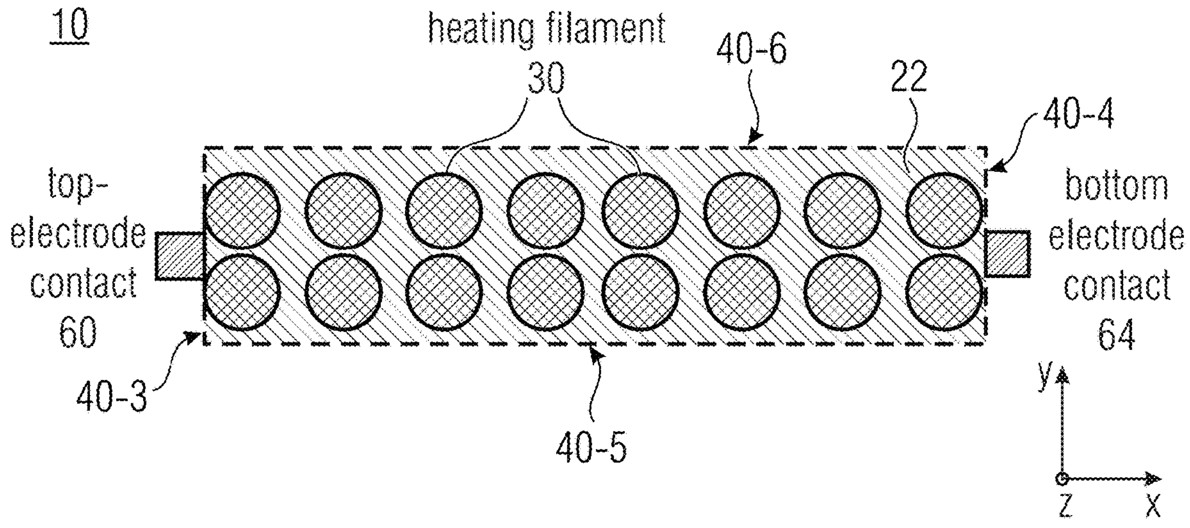

As shown in FIG. 2*b*, the heating filaments 30 may be arranged as a rectangular 2×n array in a square or rectangular vacuum chamber 22, i.e. in a vacuum chamber 22 having a rectangular footprint parallel to the x-y-plane. The array of heating filaments 30 may have a plurality with 2×n heating filaments, with m=2 and with n is an integer ≥2 (m=2, 3, 4, 5 . . . ). The top and bottom electrode contacts 62, 66 are arranged at opposing portions of the electrode regions 32, 34. The reflector elements 40-3, 40-4 may be formed as optical reflectors adjacent and parallel to the third and fourth side wall regions 22-3, 22-4 of the vacuum chamber 22. The reflector elements 40-5, 40-6 may be formed as optical reflectors adjacent and parallel to the fifth and sixth side wall regions 22-5, 22-6 of the vacuum chamber 22.

Figure 2C:
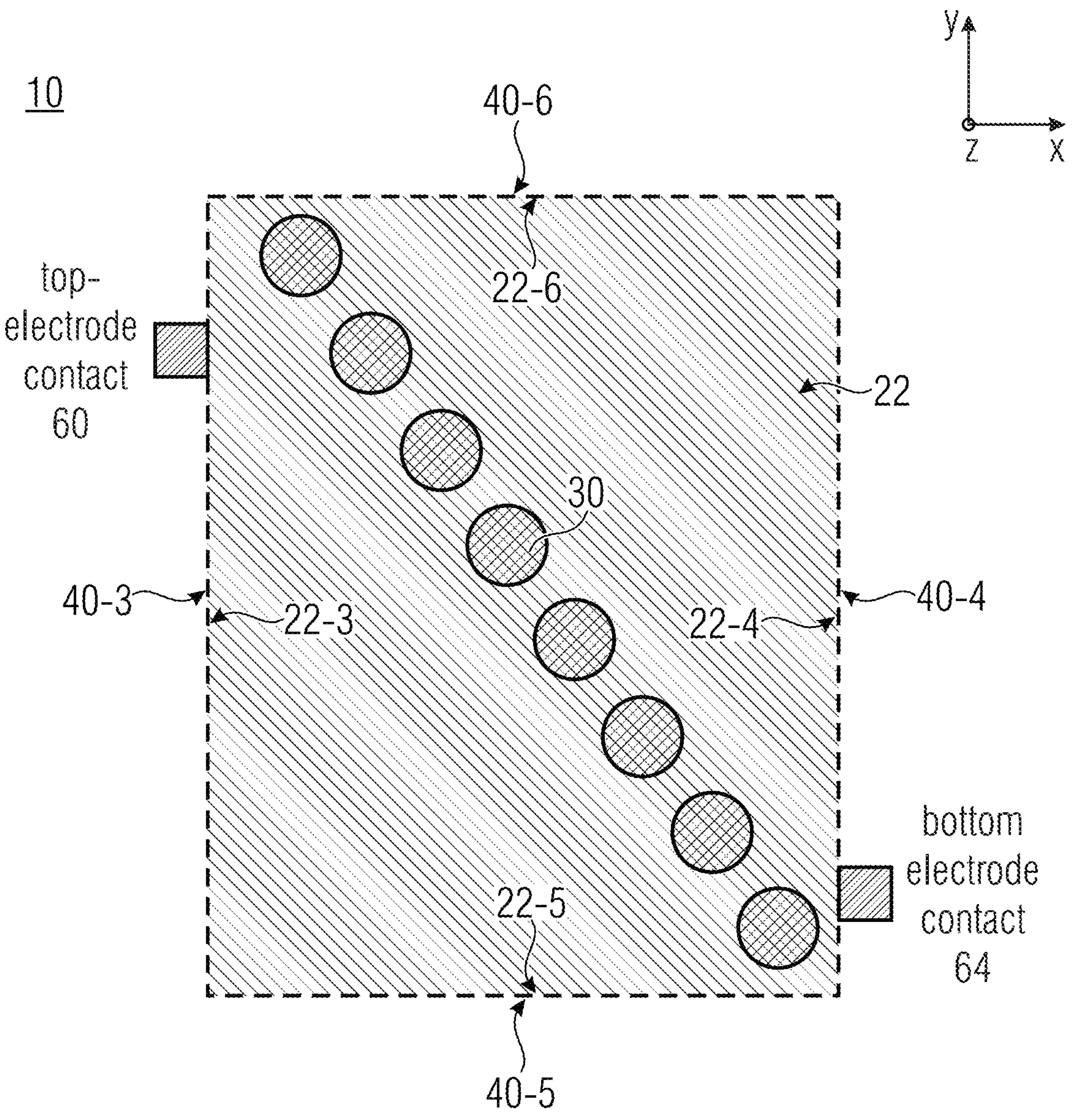

As shown in FIG. 2*c*, the heating filaments 30 may be arranged in a line arrangement in a square or rectangular vacuum chamber 22, i.e. in a vacuum chamber 22, having a square or rectangular footprint parallel to the x-y-plane. The line of heating filaments 30 may have a plurality of n heating filaments, with n is an integer ≥2 (n=2, 3, 4, 5 . . . ). The top and bottom electrode contacts 62, 66 are arranged at diagonally opposing portions of the electrode regions 32, 34. The reflector elements 40-3, 40-4 may be formed as optical reflectors adjacent and parallel to the third and fourth side wall regions 22-3, 22-4 of the vacuum chamber 22. The reflector elements 40-5, 40-6 may be formed as optical reflectors adjacent and parallel to the fifth and sixth side wall regions 22-5, 22-6 of the vacuum chamber 22.

Figure 2D:
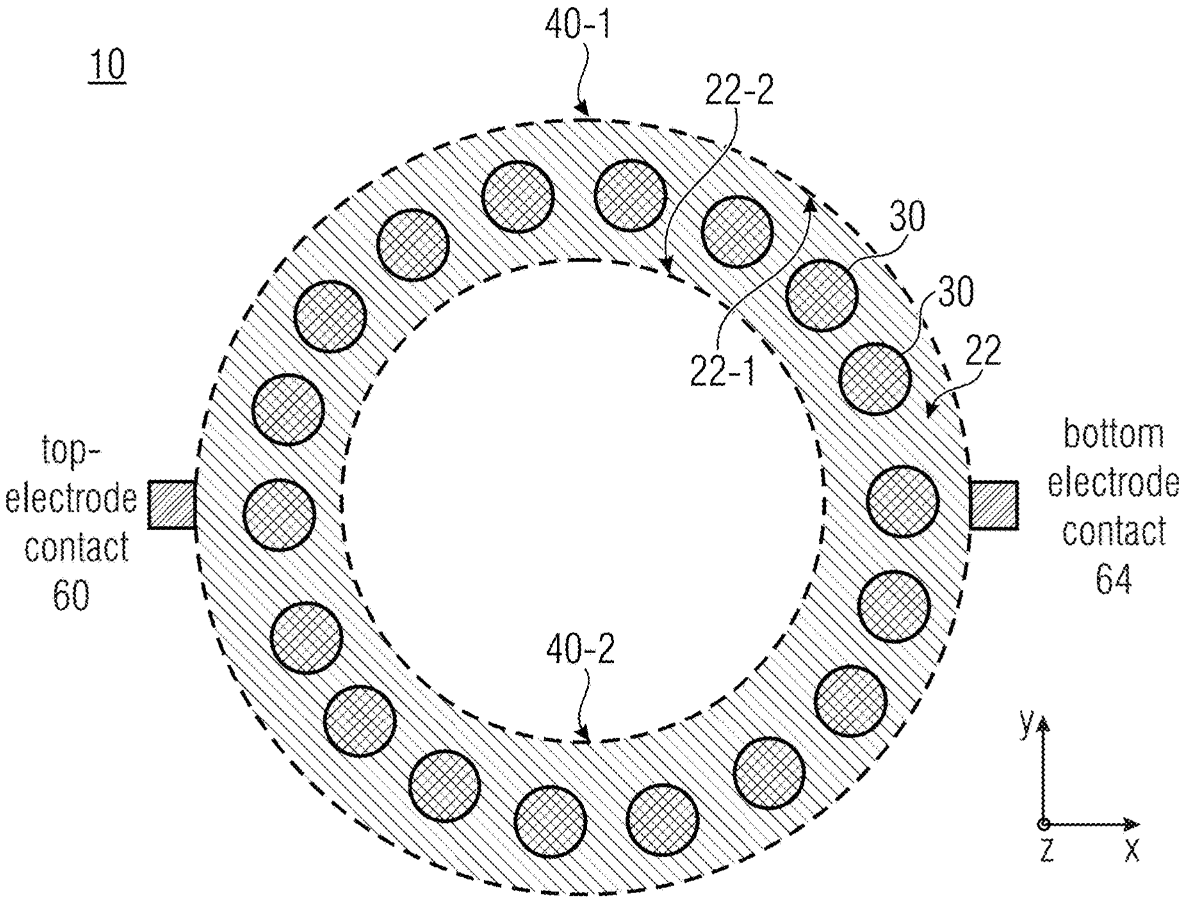

As shown in FIG. 2*d*, the heating filaments 30 may be arranged in a circular arrangement in a circular vacuum chamber 22, i.e. in a vacuum chamber 22, having a circular footprint parallel to the x-y-plane. The line of heating filaments 30 may have a plurality of n heating filaments, with n is an integer ≥2 (n=2, 3, 4, 5 . . . ). The top and bottom electrode contacts 62, 66 are arranged at opposing portions of the electrode regions 32, 34. The reflector elements 40-1, 40-2 may be formed as optical reflectors adjacent and parallel to the first and second side wall regions 22-1, 22-2 of the vacuum chamber 22.

The above explanation should make clear that the shape of the vacuum chamber 22 and the geometrical arrangement or alignment of the heating filaments 30 therein includes a large number of different implementations, wherein the implementations as shown FIGS. 2*a*-2*d* for the vacuum chamber 22 and the heating filaments 30 is not to be regarded as exhaustive. To be more specific, according to further embodiments, the shape (footprint) of the vacuum chamber 22 may also comprise one of a circular, square, oval and ellipse shape (or any convex polygon shape), for example.

FIGS. 3*a*-3*d* show different exemplary, schematic cross-sectional views (vertical=parallel to the x-z-plane) of the IR radiation source 10 with different configurations of the optical isolation structure for providing a lateral and/or vertical emission direction from the IR radiation source 10.

Figure 3A:
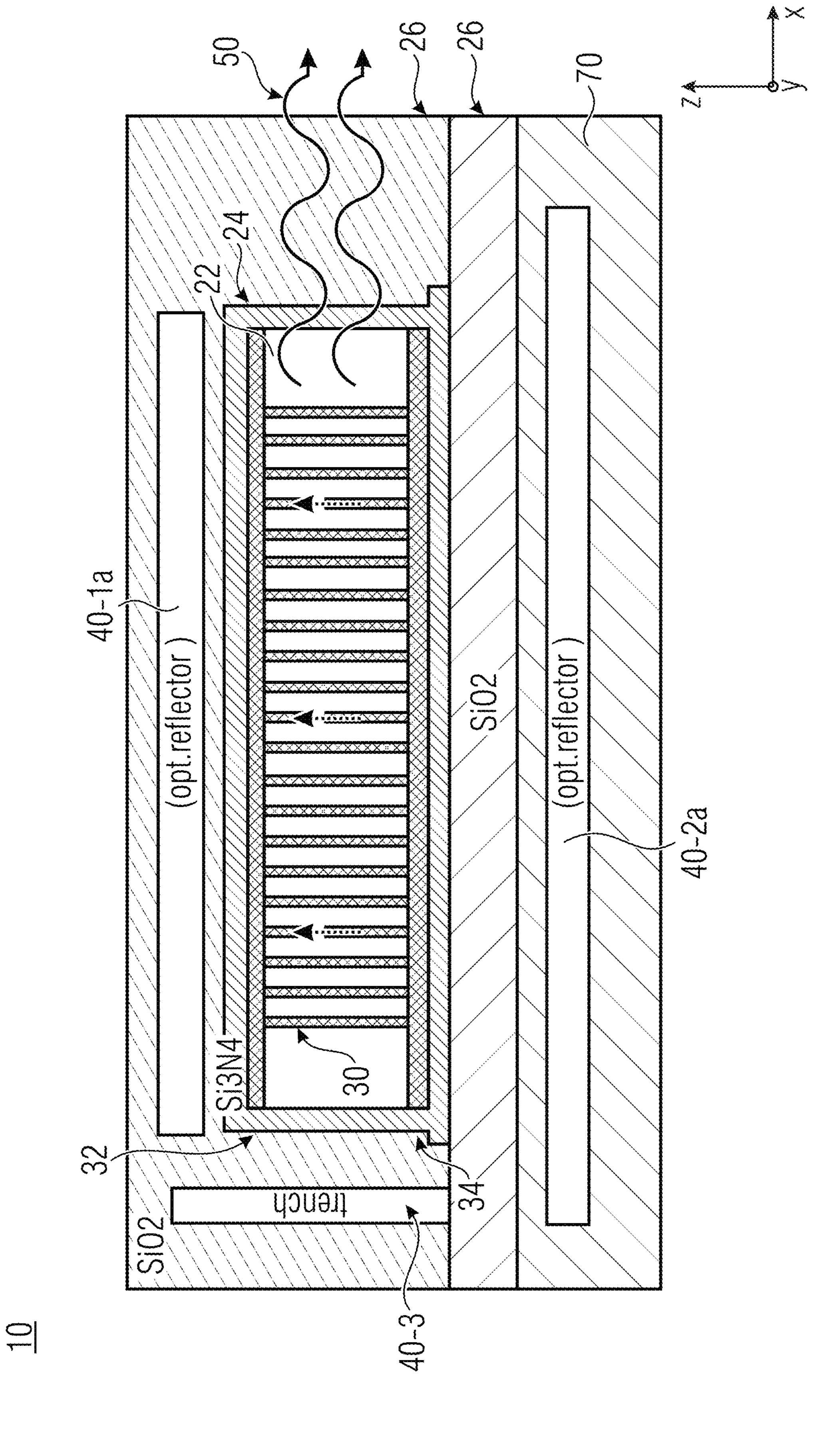
FIGS. 3*a*-3*d* show further schematic cross-sectional views of the vacuum chamber with trench-line filaments according to embodiments of the IR radiation source.

As shown in FIG. 3*a*, the IR radiation source 10 may comprise the (laterally extending) optical reflector elements 40-1*a*, 40-2*a*, wherein the vacuum chamber 22 with the heating filaments 30 is sandwiched between the optical reflector elements 40-1*a*, 40-2*a*, and further comprises the (vertically extending) optical reflector element (trench) 40-3 which is laterally arranged to the vacuum chamber 22. The IR radiation source 10 may further comprise the (vertically extending) optical reflector elements 40-5, 40-6, wherein the vacuum chamber 22 with the heating filaments 30 is sandwiched between the optical reflector elements 40-5, 40-6. Thus, the resulting emission direction of the generated IR radiation is lateral (in parallel to the x direction) of the IR radiation source 10.

Figure 3B:
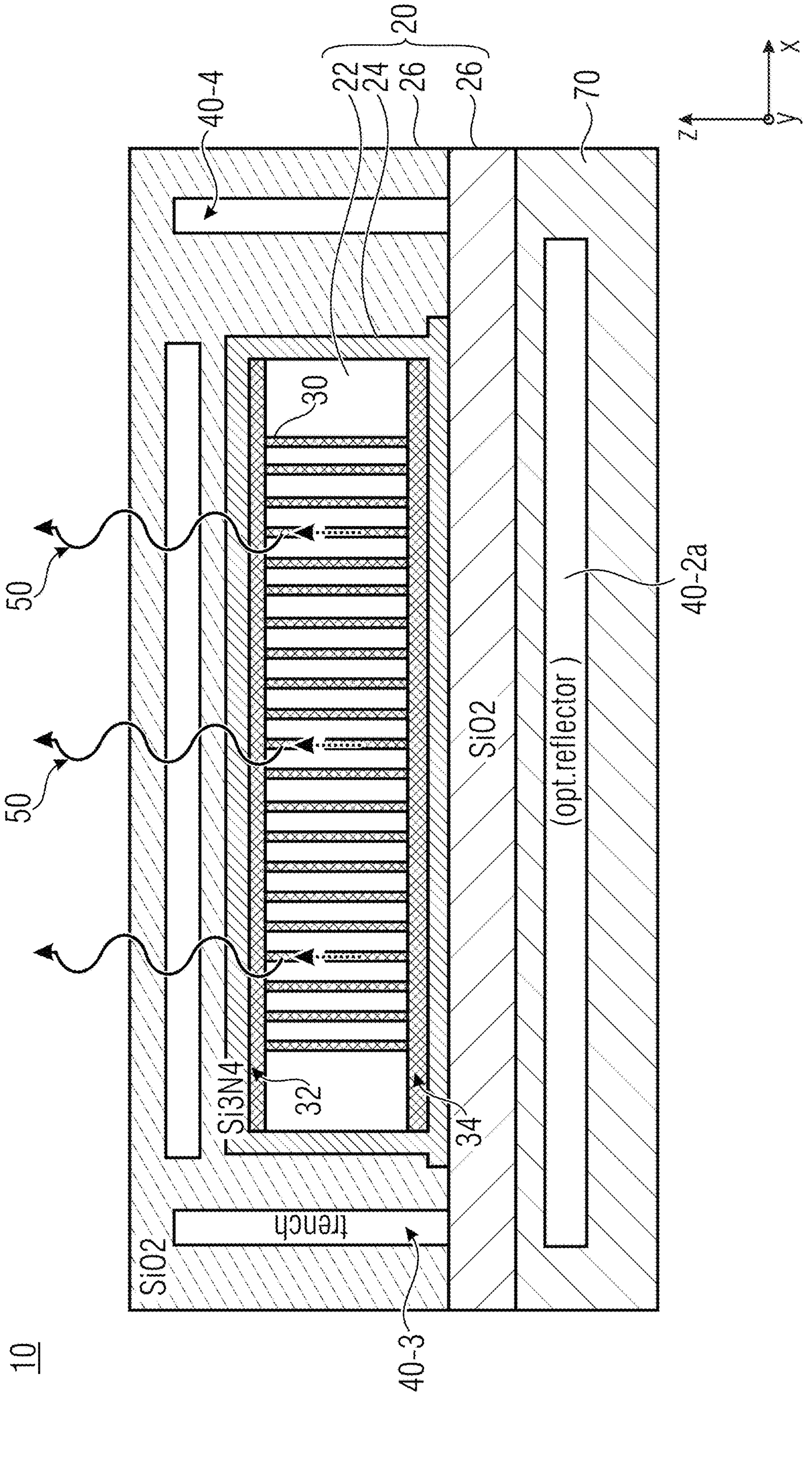

As shown in FIG. 3*b*, the IR radiation source 10 may comprise the (laterally extending) optical reflector element 40-2*a*, and further comprises the (vertically extending) optical reflector elements (trenches) 40-3, 40-4 which are laterally arranged to the vacuum chamber 22, wherein the vacuum chamber 22 with the heating filaments 30 is sandwiched between the optical reflector elements 40-3, 40-4. The IR radiation source 10 may further comprise the (vertically extending) optical reflector elements 40-5, 40-6, wherein the vacuum chamber 22 with the heating filaments 30 is sandwiched between the optical reflector elements 40-5, 40-6. Thus, the resulting emission direction of the generated IR radiation is vertical (in parallel to the z direction) of the IR radiation source 10.

Figure 3C:
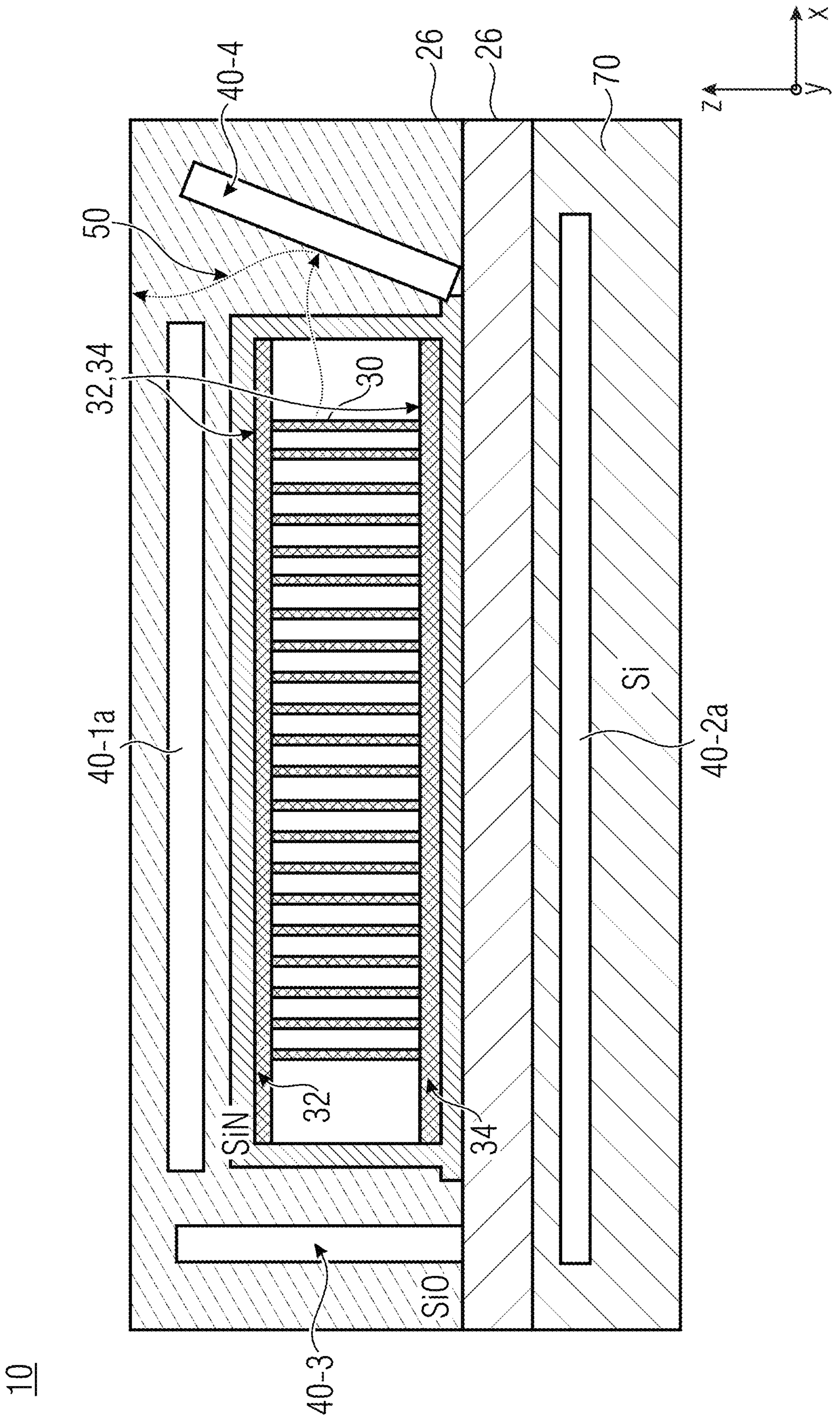

As shown in FIG. 3*c* the IR radiation source 10 may comprise the (laterally extending) optical reflector elements 40-1, 40-2, wherein the vacuum chamber 22 with the heating filaments 30 is sandwiched between the optical reflector elements 40-1, 40-2, and further comprises the (vertically extending) optical reflector elements (trenches) 40-3, 40-4 which are laterally arranged to the vacuum chamber 22. The optical reflector element (trench) 40-3 is arranged parallel to the y-z-plane, wherein the optical reflector element (trench) 40-4 is arranged with an inclined angle, e.g. 45° (e.g., between 30 and 60°) with respect to the x-y-plane. The IR radiation source 10 may further comprise the (vertically extending) optical reflector elements 40-5, 40-6, wherein the vacuum chamber 22 with the heating filaments 30 is sandwiched between the optical reflector elements 40-5, 40-6. Thus, the resulting emission direction of the generated IR radiation is lateral (in parallel to the z direction) of the IR radiation source 10.

Figure 3D:
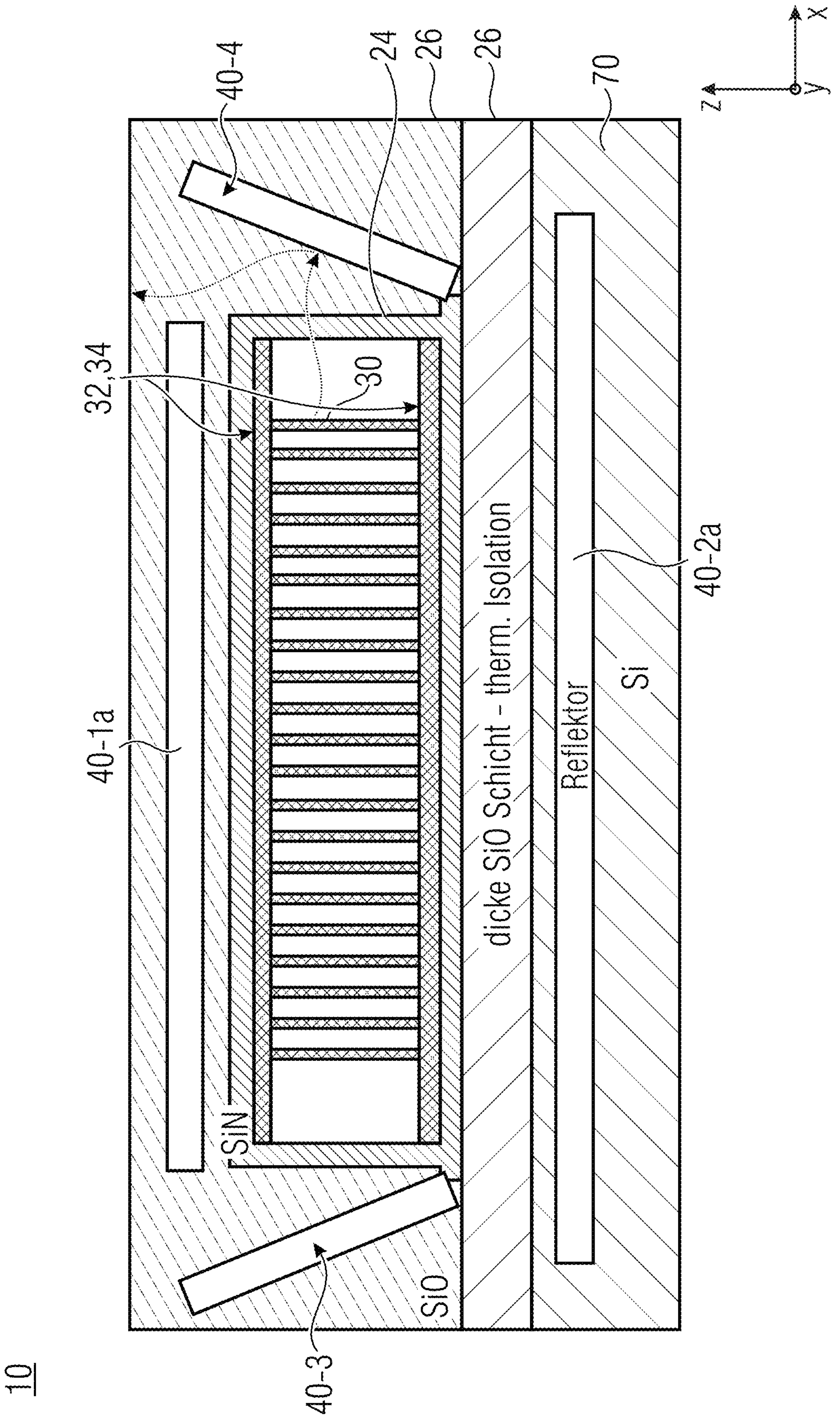

As shown in FIG. 3*d*, the IR radiation source 10 may comprise the (laterally extending) optical reflector elements 40-1, 40-2, wherein the vacuum chamber 22 with the heating filaments 30 is sandwiched between the optical reflector elements 40-1, 40-2, and further comprises the optical reflector elements (trenches) 40-3, 40-4 which are laterally arranged to the vacuum chamber 22 and are arranged with an inclined angle, e.g. 45° (e.g., between 30 and 60°) with respect to the x-y-plane. The IR radiation source 10 may further comprise the (vertically extending) optical reflector elements 40-5, 40-6, wherein the vacuum chamber 22 with the heating filaments 30 is sandwiched between the optical reflector elements 40-5, 40-6. Thus, the resulting emission direction of the generated IR radiation is lateral (in parallel to the z direction) of the IR radiation source 10.

Instead of the laterally extending optical reflector elements in form of cavities and the vertically or inclined extending optical reflector elements in form of trenches, it is pointed out to the fact that at least one, a plurality or all of these optical reflector elements are also formable by means of reflective metallic layers.

In the following, a summary of some implementations of the IR radiation source 10 according to the above embodiments and the resulting technical effects are provided in the following.

According to embodiments, the IR radiation source 10 comprises heating filaments 30 which are arranged and sealed in a vacuum chamber 22, wherein the material of the heating filaments 30 comprises at least the conductivity of highly doped polysilicon. The material for the heating filaments may, for example, comprise carbon, graphene, polysilicon or tungsten or other suitable highly conductive, CMOS process flow compatible materials.

The heating filaments 30 may be manufactured in high aspect ratios between large area electrodes (plate electrodes with a narrow alignment of the heating filaments, wherein the electrodes and heating filaments are homogeneously connected. A low expansion coefficient of the material of the heating filaments 30 supports the mechanical stability of the IR radiation source 10, wherein the heating filaments 30 comprise an elastic material which is stable in the case of vibrations. The high melting temperature of the filament material provides for a high radiation yield, especially due to the low atmospheric pressure (near vacuum) in the vacuum chamber. The low atmospheric pressure in the vacuum chamber 22 also provides for an energy optimization of the radiator source 10. According to embodiments, the vacuum chamber 22 (cavity) having the low atmospheric pressure (good vacuum) fits to the manufacturing of the heat elements, e.g. by etching an SiO sacrificial layer by means of HF (hydrofluoric acid) and a sealing, e.g. as sputter sealing, under vacuum. Further, carbon has a good etching selectivity to HF.

For achieving a reliable isolation of the vacuum chamber 22 for avoiding a later diffusion of gases into the cavity, the housing of the vacuum chamber 22 comprises a SiN/TiN . . . barrier against $H_2$, $O_2$, etc. This insulator combination provides a device passivation with a final furnace anneal. The thermal isolation of the vacuum chamber 22 may be achieved by housing the vacuum chamber 22 into thick SiO layers.

The optical isolation of the vacuum chamber 22 may be achieved by cavities and/or unfilled trenches, which optimally provide for a low heat conduction loss. Also, metal layers and trenches filled with metal are possible for at least partially providing the optical isolation.

For further increasing (optimizing) the radiation output, the optical isolation structure forms an optical waveguide structure for providing an optical path with a predominant propagation direction of the IR radiation in the sealed cavity structure and a predominant emission direction from the IR radiation source. In this connection, waveguide materials and optical elements, such as lenses, prisms, etc., can be used to provide a localized radiation output.

Additional embodiments and aspects are described which may be used alone or in combination with the features and functionalities described herein.

According to an embodiment, an IR (infrared) radiation source comprises a sealed cavity structure enclosing a vacuum chamber having a low atmospheric pressure, wherein the sealed cavity structure comprises a thermally and electrically insulating material for enclosing the vacuum chamber, a plurality of heating filaments extending in the vacuum chamber between opposing electrode regions at opposing wall regions of the vacuum chamber, wherein the heating filaments are electrically connected in parallel, and wherein the heating filaments and the electrode regions have a highly electrically conductive material, and an optical isolation structure adjacent to the vacuum chamber for optically confining the IR radiation and providing a predominant propagation direction of the IR radiation.

According to an embodiment, the heating filaments and the electrode regions comprise the same highly electrically conductive material having a melting temperature higher than 1000° Celsius.

According to an embodiment, the conductive material of the heating filaments comprises carbon, graphene, polysilicon or tungsten.

According to an embodiment, the opposing electrode regions of the heating filaments are formed as planar electrodes.

According to an embodiment, the heating filaments have a length between 0.1 and 80 micrometers and have an aspect ratio of 1:1 up to 1:80.

According to an embodiment, the insulator material of the sealed cavity structure is optically transparent to the IR radiation.

According to an embodiment, the insulating material of the sealed cavity structure comprises a first insulating layer having a silicon nitride material enclosing the vacuum chamber of the sealed cavity structure, and wherein the insulating material of the sealed cavity structure further comprises a second insulating layer comprising a silicon dioxide material for enclosing the first layer.

According to an embodiment, the insulating material of the sealed cavity structure further comprises a third insulating layer comprising a titanium nitride material.

According to an embodiment, the low atmospheric pressure in the vacuum chamber comprises a cavity pressure less than 3 mbar (2.25 Torr) or less than 1 mbar (0.75 Torr), According to an embodiment, the optical isolation structure forms an optical waveguide structure for providing an optical path with the predominant propagation direction of the IR radiation in the sealed cavity structure.

According to an embodiment, the optical isolation structure comprises optical reflector elements for providing the optical path for the IR radiation.

According to an embodiment, the optical reflector elements of the optical isolation structure comprise a metallization layer adjacent to the side wall region of the sealed cavity structure, or wherein the optical reflector elements of the optical isolation structure comprise a cavity in a substrate or a trench in the insulating material adjacent to the sealed cavity structure.

According to an embodiment, the sealed cavity structure is arranged on a substrate, wherein the optical isolation structure is formed as a metallization layer on a surface region of the substrate adjacent to a side wall region of the sealed cavity structure, or wherein the optical isolation structure is formed as a cavity in the substrate adjacent to the side wall region of the sealed cavity structure.

According to an embodiment, the cavities of the optical isolation structure comprise a thickness of about 0.3-1 μm and/or wherein the trenches of the optical isolation structure comprise a width of about 0.1-0.5 μm.

According to an embodiment, the IR radiation source further comprises an optical element for guiding the IR radiation, wherein the optical element comprises a lens and/or prism-element at a radiation output area of the sealed cavity structure.

Additional embodiments and aspects are described which may be used alone or in combination with the features and functionalities described herein.

Although some aspects have been described as features in the context of an apparatus it is clear that such a description may also be regarded as a description of corresponding features of a method. Although some aspects have been described as features in the context of a method, it is clear that such a description may also be regarded as a description of corresponding features concerning the functionality of an apparatus.

Depending on certain implementation requirements, embodiments of the control circuitry can be implemented in hardware or in software or at least partially in hardware or at least partially in software. Generally, embodiments of the control circuitry can be implemented as a computer program product with a program code, the program code being operative for performing one of the methods when the computer program product runs on a computer. The program code may for example be stored on a machine readable carrier.

In the foregoing detailed description, it can be seen that various features are grouped together in examples for the purpose of streamlining the disclosure. This method of disclosure is not to be interpreted as reflecting an intention that the claimed examples require more features than are expressly recited in each claim. Rather, as the following claims reflect, subject matter may lie in less than all features of a single disclosed example. Thus, the following claims are hereby incorporated into the detailed description, where each claim may stand on its own as a separate example. While each claim may stand on its own as a separate example, it is to be noted that, although a dependent claim may refer in the claims to a specific combination with one or more other claims, other examples may also include a combination of the dependent claim with the subject matter of each other dependent claim or a combination of each feature with other dependent or independent claims. Such combinations are proposed herein unless it is stated that a specific combination is not intended. Furthermore, it is intended to include also features of a claim to any other independent claim even if this claim is not directly made dependent to the independent claim.

Although specific embodiments have been illustrated and described herein, it will be appreciated by those of ordinary skill in the art that a variety of alternate and/or equivalent implementations may be substituted for the specific embodiments shown and described without departing from the scope of the present embodiments. This application is intended to cover any adaptations or variations of the specific embodiments discussed herein. Therefore, it is intended that the embodiments be limited only by the claims and the equivalents thereof.

What is claimed is:

1. An IR (infrared) radiation source comprising:

a sealed cavity structure enclosing a vacuum chamber having a low atmospheric pressure, wherein the sealed cavity structure comprises a thermally and electrically insulating material enclosing the vacuum chamber;

a plurality of heating filaments extending in the vacuum chamber between opposing electrode regions at opposing wall regions of the vacuum chamber, wherein the heating filaments are electrically connected in parallel, and wherein the heating filaments and the electrode regions comprise a highly electrically conductive material; and an optical isolation structure outside the vacuum chamber and different and distinct from the insulating material, the optical isolation structure being configured for optically confining IR radiation and for providing a predominant propagation direction of the IR radiation.

2. The IR radiation source of claim 1, wherein the heating filaments and the electrode regions comprise the same highly electrically conductive material having a melting temperature higher than 1000° Celsius.

3. The IR radiation source of claim 1, wherein the conductive material of the heating filaments comprises carbon, graphene, polysilicon or tungsten.

4. The IR radiation source of claim 1, wherein the opposing electrode regions of the heating filaments are planar electrodes.

5. The IR radiation source of claim 1, wherein the heating filaments have a length between 0.1 and 80 micrometers and have an aspect ratio of 1:1 up to 1:80.

6. The IR radiation source of claim 1, wherein the insulator insulating material of the sealed cavity structure is optically transparent to the IR radiation.

7. The IR radiation source of claim 1, wherein the low atmospheric pressure in the vacuum chamber is a cavity pressure less than 3 mbar.

8. The IR radiation source of claim 1, wherein the optical isolation structure forms an optical waveguide structure configured for providing an optical path with the predominant propagation direction of the IR radiation in the sealed cavity structure.

9. The IR radiation source of claim 1, wherein the optical isolation structure comprises optical reflector elements configured for providing an optical path for the IR radiation.

10. The IR radiation source of claim 9, wherein the optical reflector elements of the optical isolation structure comprise a metallization layer adjacent to a side wall region of the sealed cavity structure, or wherein the optical reflector elements of the optical isolation structure comprise a cavity in a substrate or a trench in the insulating material adjacent to the sealed cavity structure.

11. The IR radiation source of claim 10, wherein the cavities of the optical isolation structure comprise a thickness of about 0.3-1 μm, and wherein the trenches of the optical isolation structure comprise a width of about 0.1-0.5 μm.

12. The IR radiation source of claim 1, wherein the sealed cavity structure is arranged on a substrate, wherein the optical isolation structure is formed as a metallization layer on a surface region of the substrate adjacent to a side wall region of the sealed cavity structure, or wherein the optical isolation structure is formed as a cavity in the substrate adjacent to the side wall region of the sealed cavity structure.

13. The IR radiation source of claim 10, wherein the cavity of the optical isolation structure comprises a thickness of about 0.3-1 μm, or wherein the trench of the optical isolation structure comprises a width of about 0.1-0.5 μm.

14. The IR radiation source of claim 1, further comprising:

an optical element for guiding the IR radiation, wherein the optical element comprises a lens or a prism-element at a radiation output area of the sealed cavity structure.

15. The IR radiation source of claim 1, further comprising:

an optical element for guiding the IR radiation, wherein the optical element comprises a lens and a prism-element at a radiation output area of the sealed cavity structure.

16. An IR (infrared) radiation source comprising:

a sealed cavity structure enclosing a vacuum chamber having a low atmospheric pressure, wherein the sealed cavity structure comprises a thermally and electrically insulating material enclosing the vacuum chamber;

a plurality of heating filaments extending in the vacuum chamber between opposing electrode regions at opposing wall regions of the vacuum chamber, wherein the heating filaments are electrically connected in parallel, and wherein the heating filaments and the electrode regions comprise a highly electrically conductive material; and an optical isolation structure outside the vacuum chamber and different and distinct from the insulating material, wherein the optical isolation structure is configured for optically confining IR radiation and for providing a predominant propagation direction of the IR radiation, and wherein the optical isolation structure is located within the sealed cavity structure.

17. The IR radiation source of claim 16, wherein the insulating material of the sealed cavity structure comprises a first insulating layer having a silicon nitride material enclosing the vacuum chamber of the sealed cavity structure, wherein the insulating material of the sealed cavity structure further comprises a second insulating layer comprising a silicon dioxide material enclosing the first insulating layer, and wherein the insulating material of the sealed cavity structure further comprises a third insulating layer comprising a titanium nitride material.

18. The IR radiation source of claim 16, wherein the optical isolation structure comprises optical reflector elements configured for providing an optical path for the IR radiation.

19. An IR (infrared) radiation source comprising:

a sealed cavity structure enclosing a vacuum chamber having a low atmospheric pressure, wherein the sealed cavity structure comprises a thermally and electrically insulating material enclosing the vacuum chamber;

a plurality of heating filaments extending in the vacuum chamber between opposing electrode regions at opposing wall regions of the vacuum chamber, wherein the heating filaments are electrically connected in parallel, and wherein the heating filaments and the electrode regions comprise a highly electrically conductive material; and an optical isolation structure adjacent to the vacuum chamber, the optical isolation structure being configured for optically confining IR radiation and for providing a predominant propagation direction of the IR radiation, wherein the insulating material of the sealed cavity structure comprises a first insulating layer having a silicon nitride material enclosing the vacuum chamber of the sealed cavity structure, and wherein the insulating material of the sealed cavity structure further comprises a second insulating layer comprising a silicon dioxide material enclosing the first insulating layer.

20. The IR radiation source of claim 19, wherein the insulating material of the sealed cavity structure further comprises a third insulating layer comprising a titanium nitride material.

* * * * *